United States Patent
Mattil et al.

(10) Patent No.: US 10,719,060 B2
(45) Date of Patent: Jul. 21, 2020

(54) METHOD FOR OPTIMIZING MOTION PROFILES, COMPUTER PROGRAM PRODUCT, CONTROL DEVICE AND INSTALLATION OR ROBOT

(71) Applicant: Siemens Aktiengesellschaft, Munich (DE)

(72) Inventors: Dirk Mattil, Moehrendorf (DE); Sebastian Thiemann, Erlangen (DE); Andreas Werner, Lindlar (DE)

(73) Assignee: Siemens Aktiengesellschaft, Munich (DE)

( * ) Notice: Subject to any disclaimer, the term of this patent is extended or adjusted under 35 U.S.C. 154(b) by 307 days.

(21) Appl. No.: 15/808,147

(22) Filed: Nov. 9, 2017

(65) Prior Publication Data

US 2018/0136623 A1    May 17, 2018

(30) Foreign Application Priority Data

Nov. 11, 2016   (EP) ...................................... 16198398

(51) Int. Cl.
*G05B 19/19*    (2006.01)
*B25J 9/16*    (2006.01)
(Continued)

(52) U.S. Cl.
CPC ................ *G05B 19/19* (2013.01); *B25J 3/00* (2013.01); *B25J 9/1651* (2013.01); *B25J 9/1664* (2013.01);
(Continued)

(58) Field of Classification Search
CPC .................. G05B 19/19; G05B 19/416; G05B 2219/34015; G05B 2219/35585;
(Continued)

(56) References Cited

U.S. PATENT DOCUMENTS

| 2004/0128022 | A1* | 7/2004 | Fujibayashi | ....... G05B 19/4103 |
| | | | | 700/213 |
| 2008/0215164 | A1* | 9/2008 | Denk | ....................... B25J 9/163 |
| | | | | 700/29 |

(Continued)

FOREIGN PATENT DOCUMENTS

| CN | 102298391 | 12/2011 |
| CN | 102722140 | 10/2012 |

(Continued)

*Primary Examiner* — Dalena Tran
(74) *Attorney, Agent, or Firm* — Cozen O'Connor (57) ABSTRACT

A method for optimizing at least one motion profile, a computer program product for performing the method and a related control device for this purpose, wherein commencing from a master motion profile, at least one slave motion profile describes a motion of an actuator, the respective slave motion profile being connected via a cam disk function and/or a kinematic transformation, where the motion profiles are divided into areas, based constraints of slave motion profiles, the maximum speed of the master motion profile is computed for each area, a difference between the highest and the lowest maximum speed is selected, the area having the highest maximum speed is subsequently reduced, and the area having the lowest maximum speed is enlarged, until the difference between the two maximum speeds is less than a tolerance.

17 Claims, 5 Drawing Sheets

(51) Int. Cl.
*B25J 3/00* (2006.01)
*G05B 19/416* (2006.01)

(52) U.S. Cl.
CPC .. *G05B 19/416* (2013.01); *G05B 2219/35585* (2013.01)

(58) Field of Classification Search
CPC ......... G06F 17/141; B25J 3/00; B25J 9/1651; B25J 9/1664
USPC ......... 700/248, 3, 188, 189, 61; 74/567, 569
See application file for complete search history.

(56) References Cited

U.S. PATENT DOCUMENTS

| | | | |
|---|---|---|---|
| 2009/0088891 A1* | 4/2009 | Birzer | G05B 19/416 700/186 |
| 2014/0277686 A1 | 9/2014 | Wang et al. | |
| 2015/0168940 A1 | 6/2015 | Geweth et al. | |
| 2016/0179079 A1 | 6/2016 | Kram et al. | |
| 2017/0262574 A1 | 9/2017 | Schilgen et al. | |

FOREIGN PATENT DOCUMENTS

| | | |
|---|---|---|
| CN | 104714471 | 6/2015 |
| DE | 102007049447 | 4/2009 |
| DE | 102014223898 | 5/2016 |
| EP | 2680095 | 1/2014 |
| EP | 2952991 | 12/2015 |
| EP | 3037903 | 6/2016 |
| WO | WO 2007/014832 | 2/2007 |

\* cited by examiner

FIG 5

METHOD FOR OPTIMIZING MOTION PROFILES, COMPUTER PROGRAM PRODUCT, CONTROL DEVICE AND INSTALLATION OR ROBOT

BACKGROUND OF THE INVENTION

1. Field of the Invention

The invention relates to a method for optimizing motion profiles, a computer program product and an installation or a robot.

2. Description of the Related Art

Motion profiles, where at least one slave motion profile is dependent on a master motion profile, are also referred to as cam disk motion profiles or as cam disks, for short, or as an electronic cam gear. Cam disk motion profiles are in widespread use today, but often need to be optimized by hand. Such optimization is disadvantageously time consuming. Drives regularly have constraints such as a maximum rotation speed or a maximum acceleration.

DE 10 2007 049 447 A1 discloses a method for electronically simulating such a cam disk.

SUMMARY OF THE INVENTION

It is an object of the invention to provide an improved method in order to optimize motion profiles in a manner that overcomes the difficulties and time consuming determination of a cam disk motion profile.

This and other objects and advantages are achieved in accordance with the invention by a method, a computer program product, a control device, and by an installation or a robot.

In accordance with the method for optimizing a motion profile, at least one slave motion profile is respectively dependent on a master motion profile, where the respective slave motion profile is subject to constraints, optimized motion sequences are provided, the master motion profile and the at least one slave motion profile have a definition area and the respective definition area has a plurality of interpolation points, wherein the interpolation points divide the respective definition area into areas, where a tolerance is prescribed for the master speed profile.

The method comprises defining the areas by the interpolation points (S1), defining the constraints of the respective slave motion profile (S2), distributing the interpolation points over the respective definition area of the master/slave motion profile (S3), determining the respective maximum speed of the master motion profile in the event of compliance with the constraints in the respective area (S4), determining the area having the highest maximum speed of the master motion profile (S5), determining the area having the lowest maximum speed of the master motion profile (S6), and checking whether the difference between the highest maximum speed and the lowest maximum speed is greater or less than the tolerance (S7).

If the difference is greater than the tolerance, then the area having the highest maximum speed is reduced by virtue of the interpolation points being shifted toward one another (S8), and/or the area having the lowest maximum speed is enlarged by virtue of the interpolation points being shifted away from one another (S9), and/or steps (S4), (S5), (S6) and (S7) are performed with the reduced and the enlarged area (S10), and if the difference is less than or equal ($\leq$) to the tolerance, then the respective motion profile is provided as the optimized motion profile (S11).

As a preference, the speed for the master motion profile is set to a constant value.

The invention is based, inter alia, on the as yet unsatisfactorily achieved object of optimizing slave motion profiles that are dependent on a master motion profile simultaneously and in an automated manner.

In this context, a motion profile is the, in particular temporal, trend in the (rotation) speed or in the distance (in the case of a linear motion) or in a rotation angle (in the case of a rotary motion).

Often, the respective motion profile is periodic. In the case of a periodically recurring motion, the definition area is advantageously a period of the motion.

A motion profile is either a virtual motion profile or a real motion profile. A virtual motion profile is the motion profile of a virtual axis, for example.

A virtual axis may, particularly in the case of a robot, be a motion of an end effector in one direction. A real axis in the case of a robot corresponds to a drive for moving a robot arm.

A real motion profile generally describes the motion of a drive, such as an electric motor or a linear motor.

In the case of a rotary motion, the definition area may thus be a revolution (Phi=0 . . . 360°). The motion profile is preferably specified as the respective position within the definition area.

The motion profiles are regularly bounded in their shape by constraints. Constraints are regularly accounted for by physical bounds of the drives, such as maximum acceleration, maximum speed or maximum jolt.

The optimized motion profile is provided by the optimization of the slave motion profiles and optionally of the master motion profile. Preferably, the optimized motion profiles are provided to a control device, for example a programmable logic controller (PLC). The control device is used for controlling or regulating multiple drives on the basis of optimized motion profiles.

An interpolation point is understood to mean points of the motion profile that are distributed in the definition area. The interpolation points are used to prescribe particularly the value of the slave or master motion profile. Based on the values of the respective motion profile, the respective motion profile may be defined or prescribed.

The Individual Method Steps

With respect to step (S1), the definition area is divided into areas. An area is respectively bounded by two interpolation points. The area that respectively adjoins the edge of the definition area is bounded by the respective (outer) edge of the definition area. This means that the edge points of the definition area correspond to the interpolation points that bound the respective area toward the edge.

With respect to step (S2), the constraints assigned are, by way of example, the minimum and/or maximum speed of the respective slave motion profile. The constraint is preferably prescribed by a respective boundary of the derivative of the respective slave motion profile.

As for step (S3), the interpolation points are distributed over the definition area preferably such that the first interpolation point is arranged approximately in the center of the definition area. The interpolation point divides the definition area into two areas. Further interpolation points can be distributed in the respective area. The interpolation points divide the respective areas into a plurality of smaller areas.

The distribution and/or the order of the interpolation points are preferably stipulated by the user or by the computer program product itself. Initially, an even distribution of the interpolation points in the respective definition area is advantageous. An even distribution is understood to mean a distribution in which the interpolation points are respectively at the same distance from one another.

Advantageously, the areas are chosen to be of approximately the same magnitude. However, the interpolation points can also be distributed over the area in accordance with a random principle (analogously to a Monte Carlo distribution).

Furthermore, the interpolation points may be arranged at zeros of polynomials such as Legendre polynomials or Chebyshev polynomials or other orthogonal polynomial functions.

As a preference, only the respective distances between the interpolation points are prescribed by the user. An order of the arrangement of the interpolation points is prescribed Regarding step (S4), for the determination of the maximum speeds of the master motion profile, it is borne in mind that none of the respective slave motion profile is permitted to infringe a constraint.

The respective constraint of the respective slave motion profile stipulates the respective maximum speed of the master motion profile. The stipulation is made for one area in each case. Thus, an area is respectively assigned a maximum speed of the master motion profile.

The maximum speed in the respective definition area of the master motion profile corresponds, before the optimization by the method presented here, to that speed that is determined by the area of the minimum maximum speed.

With respect to steps (S5) and (S6), the area (a first area) in which the respective constraint of the respective slave motion profile firstly allows the highest maximum speed of the master motion profile is determined.

Secondly, the area (a second area) in which the respective constraint of the respective slave motion profile allows the lowest (least) maximum speed of the master motion profile is determined.

In the next step (S7), the difference between the highest maximum speed and the lowest maximum speed is determined. For non-optimized motion profiles, the difference is normally higher than the tolerance. The tolerance is a measure of how well the motion profiles are optimized. The tolerance is preferably stipulated by the user.

Alternatively, the subsequent method steps (S4) to (S8) can be performed until the change of the difference approaches a limit difference of zero.

After that area having the highest maximum speed (first area) and that area having the lowest maximum speed (second area) are ascertained, the first area is reduced and the second area is enlarged, consistent with steps (S8), (S9) and (S10).

Normally, the second area is reduced by as much as the other area is enlarged. As such, the definition area is not altered.

The reduction of the first area moves the two interpolation points together. The respective slave motion profiles are compressed in the area. As such, on account of the constraints, the maximum speed of the master motion profile decreases in the first area. The applicable inverse applies to the second area.

The shifting of the interpolation points is repeated until the difference is less than or less than or equal to the tolerance.

With respect to step (S11), if the difference is less than or less than or equal to the tolerance, then the motion profiles are optimized. The optimized motion profiles, i.e., particularly the optimized slave motion profiles, are provided to the control device or a motion controller.

A substantial advantage of the above-described method is that the master motion profile is not altered. As such, a particularly high level of precision of the motion prescribed by the optimized motion profiles is possible.

Advantageously, the master motion profile is changed, so that the respective speed of the master motion profile, particularly in the respective area, changes. This advantageously results in the interpolation points of the respective (master/slave) motion profiles being processed simultaneously. It is therefore possible to achieve a constant speed of the master motion profile without infringing constraints, particularly of the motion profiles of the slave motion profiles.

It is also an object of the invention to provide a computer program product that is configured to perform the method described here using a computation unit. To this end, the computer program product is installed on the computation unit and is loaded into a main memory for performance. The optimized motion profiles are output via an interface of the computation unit. The optimized motion profiles are preferably provided to the control device.

It is a further object of the invention to provide a control device that is used to control or regulate at least one drive, particularly electric motors or linear motors. The control device preferably has an associated computation unit. The computation unit is used to perform the method, particularly using the computer program product described above. The control device is preferably configured as a programmable logic controller (PLC).

Preferably, the control device is used to control or regulate at least one master drive and a slave drive. In this case, the control device, particularly with the support of a computation unit, is configured to control or regulate the drives in accordance with the respective optimized motion profile. Here, the control device comprises the computation unit for providing the optimized motion profiles or the computation unit is associated with the control device.

In accordance with the invention, the installation or the robot has the drives that control the motion of the robot or of the installation in accordance with the optimized motion profiles. The installation is preferably configured as a handling system, as a packaging machine, as a production machine or as a machine tool. The installation has the control device described above for the purpose of controlling or regulating the drives.

In one advantageous embodiment of the method, the master motion profile has a constant speed or an almost constant speed.

This applies particularly to a speed-optimized pass of the respective motion profiles. An almost constant speed is understood to mean that the master motion sequence is regulated to a constant speed and the respective slave motion profiles are oriented to the master speed profile.

As a result of the speed of the drive whose motion is prescribed by the master speed profile being almost constant (within the scope of control precision) over time, a channel of the control device or of the motion controller may be in a particularly simple configuration.

In a further advantageous embodiment of the method, particularly method steps (S4) to (S10) are performed repeatedly, where the following method steps are performed repeatedly: determination of the respective maximum speed of the master motion profile in the event of compliance with the constraints (RB) in the respective area (B) (S4), determination of the respective maximum speed of the master motion profile in the event of compliance with the constraints (RB) in the respective area (B) (S4), determination of the area having the highest maximum speed of the master motion profile (S5), determination of the area having the lowest maximum speed of the master motion profile (S6), and checking whether the difference between the highest maximum speed and the lowest maximum speed is greater or less than the tolerance (S7).

If the difference is greater than the tolerance (T), then the area having the highest maximum speed is reduced by virtue of the interpolation points being shifted toward one another (S8), and the area having the lowest maximum speed is enlarged by virtue of the interpolation points being shifted away from one another (S9), method steps (S4), (S5), (S6) and (S7) are performed with the reduced and the enlarged area (S10).

As a result of the optimization being repeatedly performed, not only is the area having the highest and lowest maximum speeds of the master motion profile taken into consideration, but also the areas having the respective second greatest, third greatest, . . . difference.

In a further advantageous embodiment of the method, the respective slave motion profile is linked to the master motion profile via a cam disk function. Here, a cam disk function is understood to mean a function that describes a rotary motion in accordance with the master motion profile in a, in particular, periodic manner. A cam disk function can be changed between the respective passes, however. A cam disk function may alternatively be a further function of two rotary motions.

In a further advantageous embodiment of the method, the areas or the distances between the respectively adjacent interpolation points are respectively chosen to be of equal magnitude.

Equidistantly arranged interpolation points have the advantage that the areas are respectively of the same magnitude. As a result, the respective first or second area can each be enlarged and reduced by a factor, e.g. by 10%.

In a further advantageous embodiment of the method, the respective constraint is a minimum/maximum speed, a minimum/maximum acceleration and/or a minimum/maximum jolt.

The constraints of the master motion profile and/or of the respective slave motion profile are preferably defined by an extreme (minimum or maximum) slope or curvature of the motion profile. The slope of the motion profile, which is depicted as a location/location function or a rotation angle/rotation angle function, corresponds to a speed/location function or a rotation speed/rotation angle function. Depending on the depiction, location/time functions and rotation angle/time functions can also be chosen for depiction or for optimization.

Suitable constraints are both global or local restrictions on (rotation) speed, (rotation) acceleration and/or jolt. A jolt generally denotes the third time derivative of the location function or rotation angle function.

In a further advantageous refinement of the method, the master speed profile is not altered. As a result of merely altering the respective slave motion profiles, the optimization can be performed in a simplified manner. As a preference, the master motion profile has a constant speed in this case.

In a further advantageous embodiment, the master motion profile and the respective slave motion profile are linked via a kinematic transformation. A kinematic transformation is understood to mean a transformation of two or more motion profiles. A preferred field of application of kinematic transformation is robotics.

By way of example, the master motion profile can describe the rectilinear motion of an end effector. The respective associated slave motion profile can describe the respective motion of the drive for a respective robot arm. An example of a kinematic transformation for a prescribed master motion profile is a Denavit-Hartenberg transformation for a direct or inverse kinematic transformation.

As a result of the present embodiment, the method described here can be used to optimize motion profiles for use in robots easily and quickly.

In one preferred embodiment of the method, the master motion profile is linked to virtual slave motion profiles and the respective virtual slave motion profile is linked to a respective real slave motion profile via the kinematic transformation.

A virtual slave motion profile is understood, by way of example, to mean a rectilinear motion of an end defector of a robot. The virtual slave motion profile is oriented, by way of example, to a motion of a point on a conveyor belt described by the master motion profile.

The real motion profile for the individual drives of the robot is computed from the respective slave motion profile using the kinematic transformation. The method can be used, as shown by the embodiment above, in particular, to optimize complex motion tasks easily and quickly.

In a further advantageous embodiment of the method, the respective virtual motion profile and/or the respective real slave motion profile are respectively subject to at least one constraint. Here, the constraints result particularly from the physical bounds for the motion (maximum acceleration, maximum speed, . . . ) of the respective drives or from the stability of the respective robot arm.

To compute the maximum speed of the master motion profile, the following relationships apply:

Let f(x) be a representation of the respective motion profile and x be a position/orientation that is dependent on time t.

It further holds that:

$$\frac{df}{dt} = \frac{df}{dx} \cdot \frac{dx}{dt} \text{ and let } \frac{dx}{dt} = \dot{x} \text{ and } f'(x) = \frac{df}{dx} \quad \text{Eq. 1}$$

In that case, the following relationship holds for the maximum speed (v_max_v or denoted as v_max) of the master motion profile given a constraint that a slave motion profile has a maximum speed:

$$v_{max} = \frac{\dot{x}}{f*(x)} \quad \text{Eq. 2}$$

The relationship holds particularly for a constant speed of the master motion profile.

Analogously, the following relationship holds for the maximum speed (v_max_a or denoted as v_max) of the master motion profile given a constraint that a slave motion profile has a maximum acceleration:

$$v_{max} = \sqrt{\frac{\dot{x}}{f''(x)}} \quad \text{Eq. 3}$$

Furthermore, the following holds for the maximum speed (v_max_r or denoted as v_max) of the master motion profile given a constraint that a slave motion profile has a maximum jolt (=change in acceleration over time):

$$v_{max} = \sqrt[3]{\frac{x}{f'''(x)}} \qquad \text{Eq. 4}$$

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The invention is described and explained in more detail below with reference to figures. The features shown in the figures can naturally also be combined individually according to the invention to form new exemplary embodiments without departing from the scope of the invention, in which.

DETAILED DESCRIPTION OF THE PRESENTLY PREFERRED EMBODIMENTS

Figure 1:
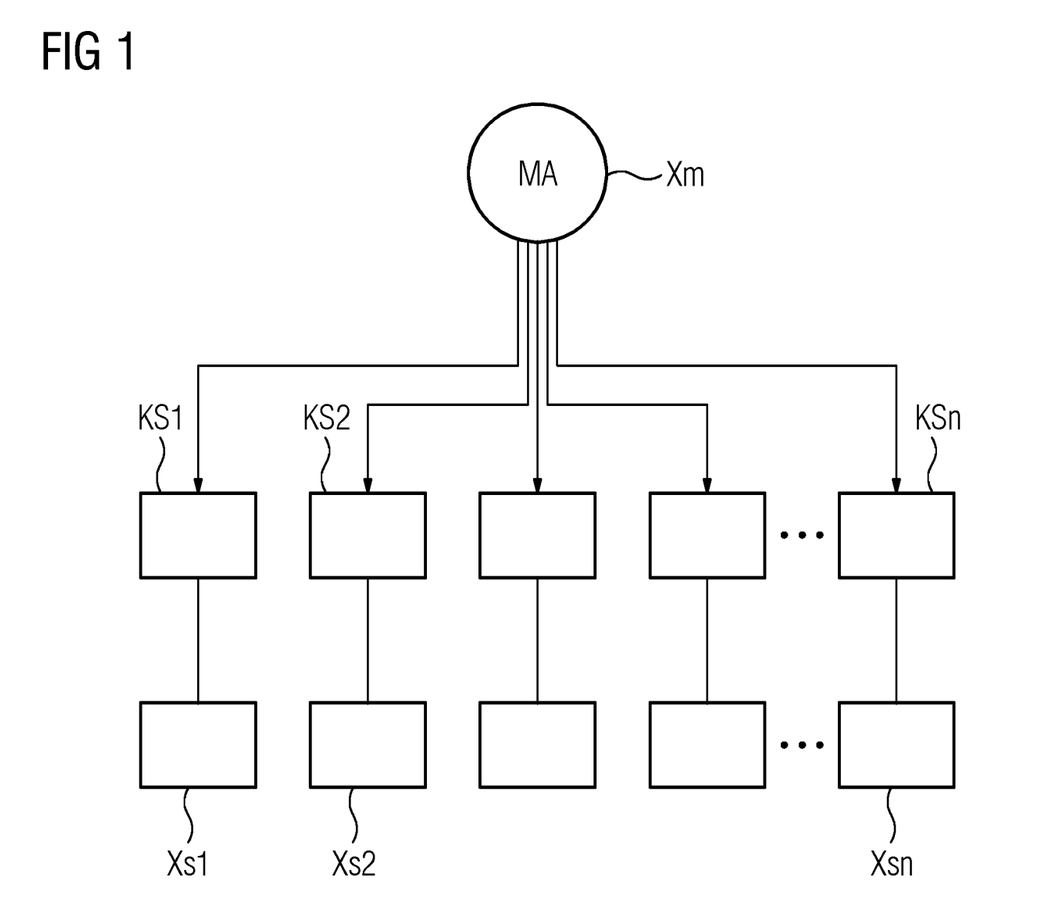
FIG. 1 shows a relationship between motion profiles in accordance with the invention.

FIG. 1 shows a relationship between motion profiles Xm, Xs1, Xs2, Xsn. Starting from a master motion profile Xm, the respective slave motion profile Xs1, Xs2, Xsn is linked via a cam disk function KS1, KS2, KSn. The respective cam disk function KS1, KS2, KSn stipulates the respective slave motion profile Xs1, Xs2, Xsn starting from the master motion profile Xm. The master motion profile starts from a real master axis MA or a virtual master axis MA, for example. A virtual master axis MA is also referred to as a virtual vertical axis (e.g., in the case of printing machines) or as a guide axis in the prior art.

Figure 2:
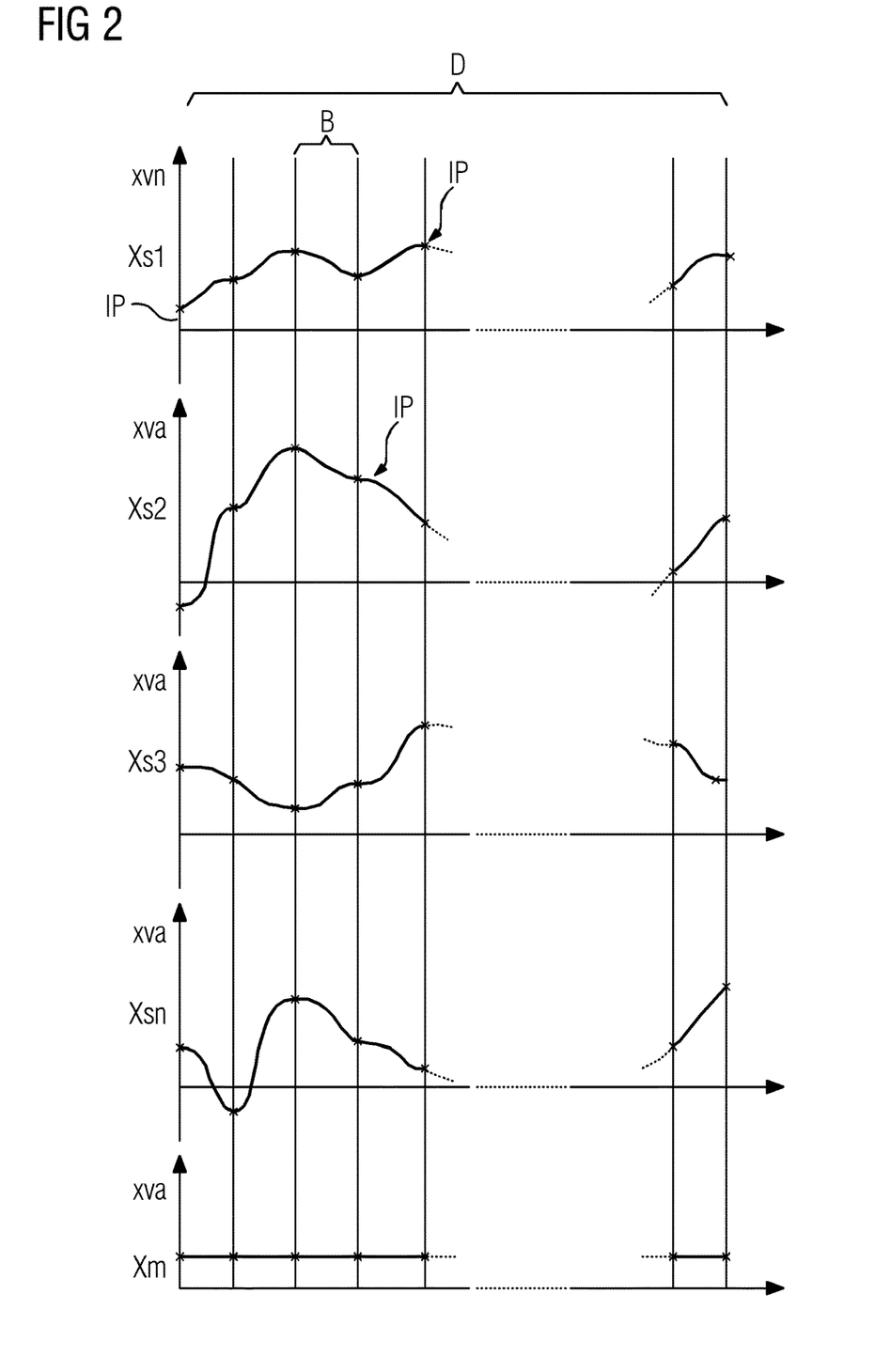
FIG. 2 shows multiple motion profiles in accordance with the invention.

FIG. 2 shows multiple motion profiles Xs1, Xs2, Xs3, Xsn, Xm. The top four motion profiles Xs1, Xs2, Xs3, Xsn are slave motion profiles Xs1, Xs2, Xs3, Xsn. At the bottom, the master motion profile Xm is shown. Here, the master motion profile Xm has a constant speed v. In the depiction of the motion profiles Xm, Xs1, Xs2, Xs3, Xsn that is shown, the depiction is provided as the function of the location based on time or based on an orientation. The depiction shown can also be understood as the function of speed v based on time or the orientation. The respective motion profile Xs1, Xs2, Xs3, Xsn, Xm has a respective definition area D. The definition area D may be a time range, at least one revolution, or a length. The definition area D is divided into areas B by the interpolation points IP. In this case, the interpolation points IP are shown to be approximately equidistant. The interpolation points IP may alternatively be arranged such that they are closer together in areas B in which a slave motion profile Xs1, Xs2, Xs3, Xsn has a fast motion than in areas B in which the slave motion profile Xs1, Xs2, Xs3, Xsn does not have a fast motion.

The respective motion profile Xs1, Xs2, Xs3, Xsn, Xm is divided into areas B. The areas B are bounded by interpolation points IP. The interpolation points IP of the respective motion profile Xs1, Xs2, Xs3, Xsn, Xm indicate at what position x the respective motion profile Xs1, Xs2, Xs3, Xsn, Xm trends at what speed v and/or at what acceleration a. Here, the interpolation points IP for each motion profile Xs1, Xs2, Xs3, Xsn, Xm are arranged at the same point. The interpolation points IP define the respective definition area D.

The respective constraint RB of a slave motion profile Xs1, Xs2, Xs3, Xsn may be a maximum change in the motion of a slave motion profile Xs1, Xs2, Xs3, Xsn. This corresponds to a maximum speed v for a location depiction of the respective motion profile Xs1, Xs2, Xs3, Xsn, Xm.

For the sake of better clarity, the motion profiles Xs1, Xs2, Xs3, Xsn, Xm are not shown over the whole definition area D, but rather only the first areas B and the last area B.

The abscissa shows a rotation angle, by way of example, and the ordinate indicates an associated position x for the respective motion profile Xs1, Xs2, Xs3, Xsn, Xm.

The speed v of the respective motion profile Xs1, Xs2, Xs3, Xsn, Xm is then the derivative of the respective motion profile Xs1, Xs2, Xs3, Xsn, namely v=dx/dt. Accordingly, the acceleration a is the second derivative a=dv/dt=d(dx/dt)/dt.

Figure 3:
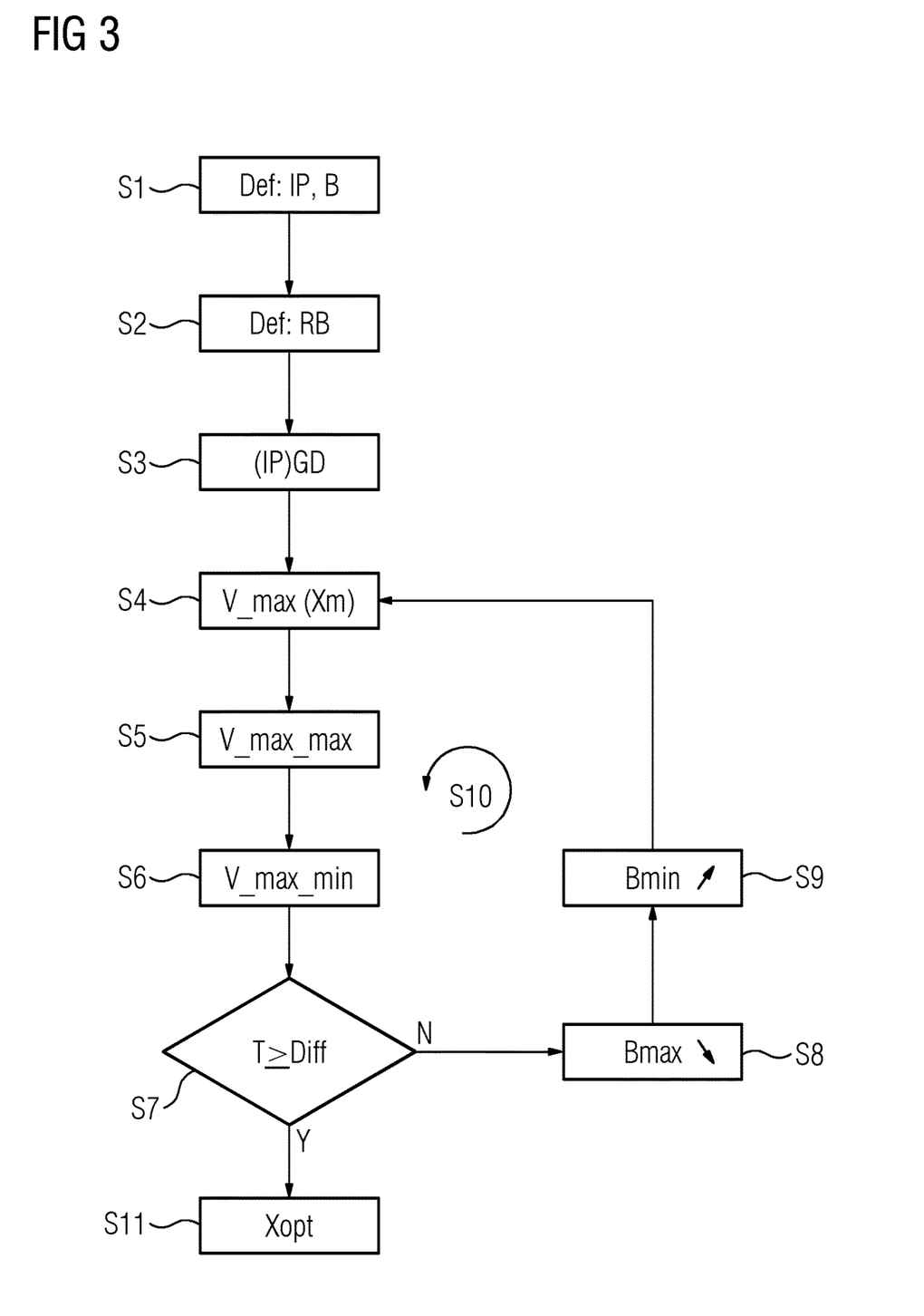
FIG. 3 shows a flowchart of the method in accordance with the invention.

FIG. 3 shows a flowchart of the method in accordance with the invention. The flowchart shows the sequence of the individual method steps for optimizing motion profiles Xs1, Xs2, Xs3, Xsn, Xm. Subsequently, method steps S1 to S11 are presented and explained.

In the first method step (S1), the respective slave motion profile Xs1, Xs2, Xs3, Xsn is prescribed. To this end, particularly the slave motion profile Xs1, Xs2, Xs3, Xsn is defined using the interpolation points IP. As such, a motion profile may be prescribed using a plurality of interpolation points IP by position x, speed v and/or acceleration a. If motion profiles Xs1, Xs2, Xs3, Xsn, Xm are already prescribed, interpolation points IP in the definition area D can be chosen. Normally, the interpolation points IP are respectively prescribed at the same point in the respective motion profile Xs1, Xs2, Xs3, Xsn, Xm.

In the second method step (S2), constraints RB are stipulated. A constraint may be a maximum speed of a motion profile Xs1, Xs2, Xs3, Xsn in at least one area B. A constraint RB may also be a maximum acceleration for a motion profile Xs1, Xs2, Xs3, Xsn. Constraints are preferably prescribed as maximum derivatives of the respective motion profile Xs1, Xs2, Xs3, Xsn, Xm based on time.

In the third method step (S3), the interpolation points IP are distributed in the definition area D of the respective motion profile Xs1, Xs2, Xs3, Xsn, Xm. The distribution is preferably chosen such that the areas B are respectively of the same magnitude. If the interpolation points are already prescribed, then they can also be shifted.

In the fourth method step (S4), the respective possible maximum speed v_max of the master motion profile Xm is computed for the respective area. The maximum speed v_max is computed, by way of example, using the relationship:

$$\text{v\_max\_v} = \frac{dx/dt}{df(x)/dx} \qquad \text{Eq. 5}$$

Here, v_max_v means the maximum speed for a speed-oriented constraint RB.

When a prescribed maximum speed is the constraint RB of a slave motion profile Xs1, Xs2, Xs3, Xsn, the maximum speed v_max is taken into consideration as the constraint RB. Here, f(x) is the location function of the respective motion profile Xs1, Xs2, Xs3, Xsn. In other words, it holds that f(x)=Xs1 or f(x)=Xs2 or . . . .

For a prescribed maximum acceleration of a slave motion profile Xs1, Xs2, Xs3, Xsn, the maximum speed v_max is computable:

$$\text{v\_max\_a} = \sqrt{\frac{d^2x/dt^2}{d^2f/dx^2}} \qquad \text{Eq. 6}$$

When there are multiple constraints RB in an area B, for example a limited speed v of a first slave motion profile Xs1, Xs2, Xs3, Xsn and a limited acceleration of a further slave motion profile Xs1, Xs2, Xs3, Xsn, the respective minimum of the maximum speeds v_max=min{v_max_v, v_max_a} applies. The respective maximum speed v_max is computed for each area B.

In the fifth method step (S5), the highest maximum speed v_max_max=max{v_max} is determined, or the area B having the highest maximum speed v_max_max is selected.

In the sixth method step (S6), the lowest maximum speed v_max_min=min{v_max} is determined, or the area B having the lowest maximum speed v_max_min is selected.

In the seventh method step (S7), the difference Diff between the highest maximum speed v_max_max and the lowest maximum speed v_max_min is computed. The difference is compared with a tolerance T. There are two possibilities in this case (i) the difference Diff is less than or equal to the tolerance T or (ii) the difference Diff is greater than the tolerance T. If the difference Diff is greater than the tolerance T (Y case), the eighth method step (S8) is performed next. If the difference Diff is less than or equal to the tolerance T (N case), on the other hand, the method skips to the eleventh method step (S11).

In the eighth method step (S8), the area Bmax having the highest maximum speed v_max_max is reduced. The reduction of this area Bmax likewise reduces the applicable area B of the respective slave motion profile Xs1, Xs2, Xs3, Xsn. The applicable speed v or the applicable acceleration a in the respective area Bmax is preferably increased and moved closer to the respectively existing constraint.

In the ninth method step (S9), the area Bmin having the lowest maximum speed v_max_min is enlarged. The enlargement of this area Bmin also enlarges the applicable area of the respective slave motion profile Xs1, Xs2, Xs3, Xsn. The applicable speed v or the applicable acceleration a in the respective area Bmin is reduced thereby. Particularly in the ninth method step, the speed of the master motion profile Xm is preferably increased.

In the tenth method step (S10), the respectively changed motion profiles Xs1, Xs2, Xs3, Xsn with the adapted areas are re-supplied to method step (S4) and the loop of method steps (S4) to (S9) is performed until the difference Diff is less than the tolerance T.

After a few passes, the difference Diff is normally less than or at least equal to the tolerance T. In this case (N case), the eleventh method step (S11) is performed.

In the eleventh method step (S11), the optimized motion profiles Xopt are provided to a control device. Based on the optimized motion profiles that now exist, it is possible for an installation, such as a production machine, to control or regulate its respective drives.

Normally, the tolerance is prescribed by the user in this case. The smaller the tolerance chosen, the better optimized are the motion profiles.

The aim in this case is particularly to increase the speed of the master motion profile Xm given unaltered constraints of the slave motion profiles Xs1, Xs2, Xs3, Xsn.

Figure 4:
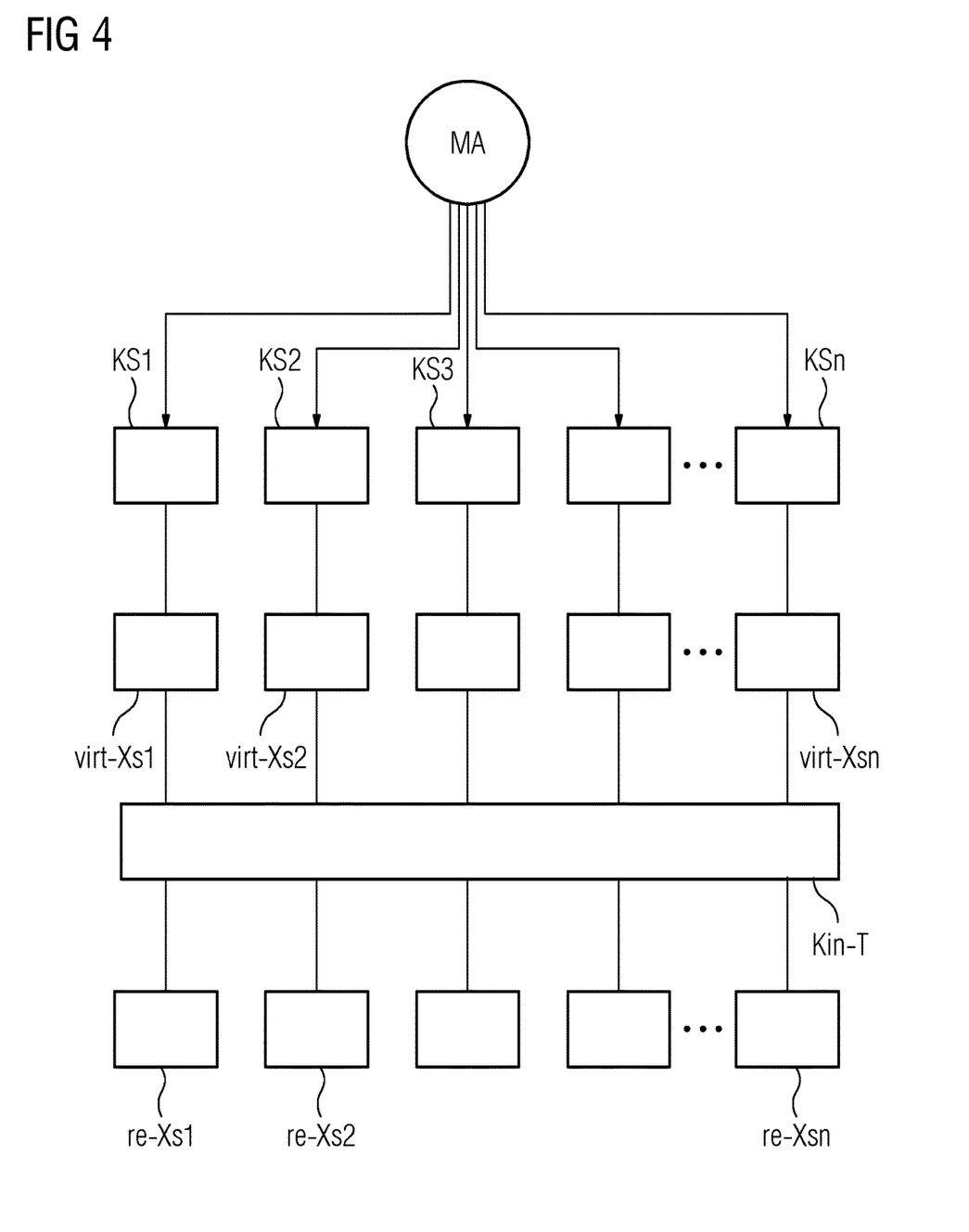
FIG. 4 shows the use of a kinematic transformation in accordance with the invention.

FIG. 4 shows the use of a kinematic transformation Kin_T. Starting from a master motion profile Xm, virtual slave motion profiles virt-Xs1, virt-Xs2, virt-Xsn are generated via cam disk functions KS1, KS2, KS3, KSn. The respective virtual slave motion profile virt-Xs1, virt-Xs2, virt-Xsn is, for example, motions of an end effector of a robot. By way of example, the respective virtual slave motion profile virt-Xs1, virt-Xs2, virt-Xsn is a motion of the end effector in a spatial direction or a direction of rotation. In line with the design of the robot, a virtual slave motion profile virt-Xs1, virt-Xs2, virt-Xsn can be regarded as a new master motion profile virt-Xm (also symbolized by MA). The virtual master motion profile MA is linked to two real slave motion profiles re-Xs3, re-Xs4 using the kinematic transformation Kin-T. Here, a master motion profile Xm is accordingly associated with at least one slave motion profile (Xs1), (Xs2). The linking of the motion profiles Xm, Xs1, Xs2, . . . , as shown in FIG. 1, is now no longer effected via the cam disk function KS1, KS2 but rather via the kinematic transformation Kin-T.

Figure 5:
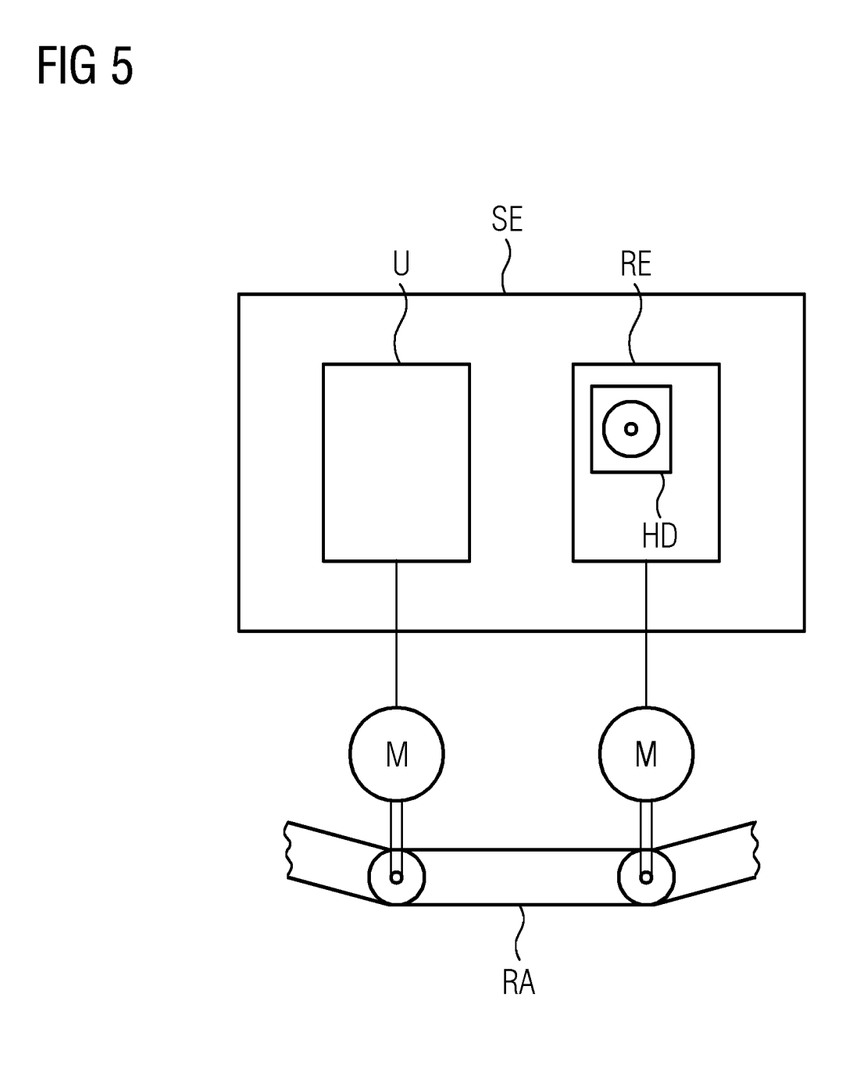
FIG. 5 shows a control device with a computation unit in accordance with the invention.

FIG. 5 shows a control device SE with a computation unit RE. The control device SE is used, possibly with support from a converter U (frequency converter), to actuate electric motors M. In this case, the electric motors M are used for moving a robot arm RA of a robot. The computation device RE comprises a memory HD, particularly a hard disk or a removable storage medium such as a CD-ROM. The memory stores a computer program product. The computer program product is executed using the computation unit RE and is used for performing the method depicted, e.g., in FIG. 3.

In summary, the invention relates to a method for optimizing at least one motion profile Xm, Xs1, Xs2, Xs3, Xsn, a computer program product for performing the method and a control device for this purpose. Starting from a master motion profile Xm, at least one slave motion profile Xs1, Xs2, Xs3, Xsn describes a motion of an actuator. The respective slave motion profile Xs1, Xs2, Xs3 is connected to the master motion profile Xm, MA via a cam disk function KS1, KS2, KS3, KSn and/or a kinematic transformation Kin-T. The method for optimizing involves the motion profiles Xm, Xs1, Xs2, Xs3, Xsn being divided into areas B. Based on respective constraints RB of the slave motion profiles Xs1, Xs2, Xs3, the maximum speed v_max of the master motion profile Xm is computed for each area B. In addition, a difference Diff between the highest and the lowest maximum speed v_max_max, v_max_min is selected. The area Bmax having the highest maximum speed v_max_max is subsequently reduced, and the area Bmin having the lowest maximum speed v_max_min is enlarged, until the difference Diff between the two maximum speeds v_max_min, v_max_max is less than a tolerance T.

The invention claimed is:

1. A method for optimizing a motion profile, at least one slave motion profile being respectively dependent on a master motion profile, a respective slave motion profile being subject to constraints, optimized motion profiles being provided, the master motion profile and the at least one slave motion profile having a definition area including a plurality of interpolation points which divide a respective definition area into areas, a tolerance being prescribed for the master motion profile, the method comprising:
S1) defining the areas by the plurality of interpolation points;
S2) defining the constraints of the respective slave motion profile;
S3) distributing the plurality of interpolation points over the respective definition area of a master/slave motion profile;
S4) determining a respective maximum speed of the master motion profile in an event of compliance with the constraints in the respective area;
S5) determining an area having a highest maximum speed of the master motion profile;
S6) determining an area having a lowest maximum speed of the master motion profile;
S7) checking whether a difference between the highest maximum speed and the lowest maximum speed is greater or less than a tolerance;
S8) shifting the plurality of interpolation points toward one another to reduce the area having the highest maximum speed if the difference is greater than the tolerance; and
S9) shifting the plurality of interpolation points away from one another to enlarge the area having the lowest maximum speed if the difference is greater than the tolerance;
S10) performing steps (S4), (S5), (S6) and (S7) with the reduced and enlarged areas; and
S11) providing the respective master/slave motion profile as an optimized motion profile if the difference is less than or equal to the tolerance.

2. The method as claimed in claim 1, wherein the master motion profile has a constant speed.

3. The method as claimed in claim 2, wherein the method is performed repeatedly.

4. The method as claimed in claim 1, wherein the method is performed repeatedly.

5. The method as claimed in claim 4, wherein steps (S4) to (S10) are performed repeatedly.

6. The method as claimed in claim 1, wherein the at least one slave motion profile is linked to the master motion profile via a cam disk function.

7. The method as claimed in claim 1, wherein the areas or distances between respectively adjacent interpolation points of the plurality of interpolation points are respectively chosen to have equal magnitudes.

8. The method as claimed in claim 1, wherein a respective constraint is at least one of (i) a minimum/maximum speed, (ii) a minimum/maximum acceleration and (iii) a minimum/maximum jolt.

9. The method as claimed in claim 1, wherein the master motion profile and the at least one slave motion profile are linked via a kinematic transformation.

10. The method as claimed in claim 9, wherein the master motion profile is linked to virtual slave motion profiles and a respective virtual slave motion profile is linked to a respective real slave motion profile via the kinematic transformation.

11. The method as claimed in claim 10, wherein at least one of (i) the respective virtual motion profile and (ii) the respective real slave motion profile are respectively subject to at least one constraint.

12. The method as claimed in claim 9, wherein at least one of (i) a respective virtual motion profile and (ii) a respective real slave motion profile are respectively subject to at least one constraint.

13. A non-transitory computer program product encoded with a computer program which, when executed on a computation unit, causes optimization of a motion profile, the computer program comprising:
S1) program code for defining the areas by a plurality of interpolation points;
S2) program code for defining constraints of a respective slave motion profile;
S3) program code for distributing the plurality of interpolation points over a respective definition area of a master/slave motion profile;
S4) program code for determining a respective maximum speed of a master motion profile in an event of compliance with the constraints in the respective area;
S5) program code for determining an area having a highest maximum speed of the master motion profile;
S6) program code for determining an area having a lowest maximum speed of the master motion profile;
S7) program code for checking whether a difference between the highest maximum speed and the lowest maximum speed is greater or less than a tolerance;
S8) program code for shifting the plurality of interpolation points toward one another to reduce the area having the highest maximum speed if the difference is greater than the tolerance; and
S9) program code for shifting the plurality of interpolation points away from one another to enlarge the area having the lowest maximum speed if the difference is greater than the tolerance;
S10) program code for performing steps (S4), (S5), (S6) and (S7) with the reduced and enlarged areas; and
S11) program code for providing the respective master/slave motion profile as an optimized motion profile if the difference is less than or equal to the tolerance.

14. A control device for controlling at least one master drive and at least one slave drive, comprising:
a computation unit; and
memory;
wherein the control device being configured to control or regulate drives after provision of motion profiles;

wherein the computation unit of the control device having a non-transitory computer program product encoded with a computer program which, when executed on the computation unit, causes optimization of a motion profile, the computer program comprising:

S1) program code for defining the areas by a plurality of interpolation points;

S2) program code for defining the constraints of the respective slave motion profile;

S3) program code for distributing the plurality of interpolation points over the respective definition area of a master/slave motion profile;

S4) program code for determining a respective maximum speed of the master motion profile in an event of compliance with the constraints in the respective area;

S5) program code for determining an area having a highest maximum speed of the master motion profile;

S6) program code for determining an area having a lowest maximum speed of the master motion profile;

S7) program code for checking whether a difference between the highest maximum speed and the lowest maximum speed is greater or less than a tolerance;

S8) program code for shifting the plurality of interpolation points toward one another to reduce the area having the highest maximum speed if the difference is greater than the tolerance; and S9) program code for shifting the plurality of interpolation points away from one another to enlarge the area having the lowest maximum speed if the difference is greater than the tolerance;

S10) program code for performing steps (S4), (S5), (S6) and (S7) with the reduced and enlarged areas; and S11) program code for providing the respective master/slave motion profile as an optimized motion profile if the difference is less than or equal to the tolerance.

15. An installation having the control device as claimed in claim 14.

16. The installation of claim 15, wherein the installation comprises a robot.

17. The installation of claim 16, wherein the installation comprises one of (i) a packaging machine, (ii) a handling system (iii) a production machine and (iv) a machine tool.

* * * * *